Patented Feb. 8, 1938

2,107,857

UNITED STATES PATENT OFFICE 2,107,857

PROCESS FOR OXIDIZING PHOSPHORUS

Paul H. Emmett, Washington, D. C., assignor to Henry A. Wallace, Secretary of Agriculture of the United States of America No Drawing. Application June 7, 1937, Serial No. 146,851

4 Claims. (Cl. 23—108)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government for governmental purposes without the payment to me of any royalty thereon.

The manner in which my process improves the art of oxidizing phosphorus vapor is illustrated by the various objects that may be accomplished by my invention.

One of the objects of my invention is to effect the oxidation of elemental phosphorus to pentavalent phosphorus without the evolution of a large amount of heat. The oxidation of phosphorus vapor by free oxygen to phosphorus pentoxide evolves about 183,000 calories per gram molecular weight of $P_2O_5$ formed. On the other hand the heat of conversion of $P_4$ to $P_2O_5$ by $CO_2$ is only about 12,500 calories per mol. of $P_2O_5$. Accordingly, the energy that normally is evolved in the combination of phosphorus and oxygen is conserved by being transformed into chemical energy through the conversion of carbon dioxide to carbon monoxide.

A second object of my invention is to conserve all of the carbon monoxide originally present with the phosphorus vapor and to form as much as $2\frac{1}{2}$ gram molecular volumes of carbon monoxide for each gram atom of phosphorus oxidized to the pentavalent form.

A further object of my invention is to form a product that is essentially calcium metaphosphate by a process that conserves all CO originally present in the phosphorus-CO mixture, produces as much as ten additional volumes of carbon monoxide for each volume of $P_4$ oxidized to the pentavalent form and conserves the heat that is normally evolved by the combustion of phosphorus in air.

It is well known that elemental phosphorus is being obtained commercially in furnaces by the reaction of carbon with phosphate rock. The phosphorus so produced passes out of the phosphorus furnace in a gaseous mixture, containing at least 2 and $\frac{1}{2}$ gram molecular volumes of CO for each gram atom of phosphorus vapor. Several methods have been suggested for oxidizing the phosphorus to the pentavalent form. It is common practice to burn the phosphorus mixture in air to form phosphorus pentoxide and carbon dioxide. The pentoxide may then be dissolved in water and converted in well known ways to phosphoric acid. The phosphorus pentoxide may also be brought in contact with phosphate rock at a suitably high temperature to form a product composed substantially of calcium metaphosphate (see U. S. Patent No. 1,925,645 and 1,925,644; also German Patent No. 541,178; 1930). This product is non-hygroscopic, contains more than 60% $P_2O_5$ and is suitable for use as a phosphate fertilizer. The preparation of calcium metaphosphate by this method is described by Curtis, Copson and Abrams (Chem. and Met. Eng. March 1937). By either of these procedures, however, the carbon monoxide present in the original phosphorus-carbon monoxide furnace gas is lost. Furthermore the oxidation of a phosphorus-carbon monoxide mixture in an excess of air evolves large amounts of heat that at times prove very bothersome. In an endeavor to save the carbon monoxide in such a phosphate furnace gas a second method has been devised (H. A. Curtis, Chem. and Met. Eng. 42, June 1935), comprising the separation of phosphorus from the carbon monoxide by condensation followed by combustion of the condensed phosphorus in air. This method still entails a large evolution of heat but does conserve the carbon monoxide. A third method that has been suggested in a number of patents (German Patents 531,498, 1931; 540,068, 1931; 528,504, 1931; French Patents 624,438, 1927; 640,287, 1928), involves the oxidation of phosphorus to oxides of phosphorus by carbon dioxide added in sufficient quantities to the gaseous mixture of phosphorus vapor, CO, and other gases normally present in phosphate furnace gas. Experimental work that I have carried out shows, however, that any attempt to oxidize phosphorus vapor by causing it to react with only carbon dioxide cannot lead to the production of phosphorus pentoxide as a sole product. An equilibrium exists in the reaction $P_2O_4+CO_2 \rightleftharpoons CO+P_2O_5$ in the range above 900° such that a mixture of $P_2O_4$ (phosphorus tetroxide) and $P_2O_5$ is obtained. This mixture of oxides cannot easily be converted into pure phosphoric acid because the tetroxide reacts with water to form phosphorus acid as well as phosphoric acid. Hence, unless some additional process is resorted to for oxidizing the tetroxide or phosphorous acid, this third process for oxidizing phosphorus is not very useful in those cases in which pure phosphoric acid or phosphates (free of phosphorous acid or phosphites) are desired as products.

I have discovered a new and useful process for oxidizing phosphorus in a gas mixture such as is commonly evolved from phosphate furnaces. For example, I have found that if a suitable mixture of phosphorus vapor, CO, $CO_2$ and the usual furnace gas impurities is passed into a bed of phosphate rock at some high temperature, preferably about 1200° C., all of the phosphorus of the gas mixture is oxidized to the pentavalent form and combines with the phosphate rock to form substantially calcium metaphosphate together with 2½ gram molecular weights of carbon monoxide for each gram atomic weight of phosphorus in the original gas mixture. The action can be explained in connection with the equation written above. The phosphate rock combines with the phosphorus pentoxide thereby removing it from the equilibrium mixture $CO_2$—$P_2O_4$—CO—$P_2O_5$ allowing in consequence additional $P_2O_4$ to be oxidized by carbon dioxide to phosphorus pentoxide, this latter in turn combining with phosphate rock. In such a manner phosphorus and its lower oxides are substantially eliminated, being converted into the pentavalent form in calcium metaphosphate.

A typical procedure for carrying out my process for the oxidation of phosphorus with the formation of the calcium metaphosphate is as follows: A mixture of phosphorus vapor, carbon monoxide, and carbon dioxide either with or without additional gases is passed into some suitable solid reactant, such as phosphate rock, preferably at a temperature in excess of 900° C. If no oxygen is present, the entering gas mixture must contain at least 2½ gram molecular volumes of carbon dioxide for each gram atomic weight of elemental phosphorus. To facilitate oxidation it is even better if this ratio is as high as 5:1. Such a mixture could be made by adding about 200 volumes of carbon dioxide gas to each 100 volumes of a CO-phosphorus gas mixture used, if the latter has the usual composition of about 9% $P_4$ and 90% CO. If the percentage $P_4$ in the gas is smaller than 9% less $CO_2$ will of course have to be added.

The above representation describes a typical procedure for effecting the oxidation of phosphorus by carbon dioxide in the presence of an excess of phosphate rock to a product that is substantially calcium metaphosphate. Attention should be directed to the fact that the phosphate rock is being used as a reactant and not merely as a catalyst. Sufficient phosphate rock must be brought continuously in contact with the carbon dioxide-phosphorus mixture to react with all the phosphorus pentoxide stoichiometrically equivalent to the original phosphorus vapor. Numerous variations of my procedure may be devised, which still incorporate the essential features of the method here proposed by having carbon dioxide as the oxidizing agent and by having a reactant present that is capable of combining preferentially with the pentoxide (rather than the tetroxide) of phosphorus thereby causing all the tetroxide to be oxidized over to the pentoxide as explained in detail above. One variation that might be incorporated would consist of adding some oxygen or air to the original phosphorus-carbon monoxide mixture. As long as the oxygen thus added is not sufficient to oxidize the phosphorus and the CO completely to phosphorus pentoxide and $CO_2$, respectively, the method is essentially the same as that proposed here, because in contact with the phosphate rock or other solid reactant one will have an equilibrium mixture of $P_2O_4$—CO—$CO_2$—$P_2O_5$ from which the phosphate rock or other solid reactant will remove the $P_2O_5$ as explained above and the carbon dioxide will then act as the oxidizing agent in converting the phosphorus tetroxide to phosphorus pentoxide. Of course, if some $O_2$ is added to the gas, the percent of CO in the exit gas will be smaller than if no $O_2$ were added. Furthermore, it does not matter if the phosphorus is partially oxidized to various of its oxides before being brought in contact with the phosphate rock in the presence of carbon dioxide sufficient in quantity to effect complete oxidation of phosphorus and its lower oxides to pentavalent phosphorus. Similarly the presence of the various impurities that are usually present along with phosphorus vapor and carbon monoxide in gases coming from electric or blast furnaces used for the reduction of rock phosphate to phosphorus, do not interfere with the method here proposed. Another variation in the method consists in substituting another reactant for phosphate rock. Any of the high melting calcium compounds such as $CaSO_4$ or $CaCO_3$ can be substituted for phosphate rock, if desired, and still effect the complete oxidation of the phosphorus to the pentavalent form, since these materials are capable of combining preferentially with phosphorus pentoxide in the presence of phosphorus tetroxide to form calcium metaphosphate and let the carbon dioxide react with the phosphorus tetroxide to convert it completely to the pentoxide, which in turn is converted into calcium metaphosphate. Furthermore, other reactants than calcium compounds may be used to shift the equilibrium in the $$P_2O_4—CO—CO_2—P_2O_5$$

mixture by combining with or dissolving the $P_2O_5$ preferentially with respect to $P_2O_4$ at high temperature. Silica and alumina are two such materials. The choice of the solid reactant will be dictated by the usefulness of the solid phosphate formed and by the capability of the solid reactant combining with or dissolving the $P_2O_5$ preferentially with respect to $P_2O_4$.

Having thus described my invention, what I claim for Letters Patent is:

1. The method of oxidizing phosphorus vapor, consisting of subjecting phosphate rock at a temperature of at least 900° C. to the action of a mixture of $CO_2$ and phosphorus vapor in which the ratio of the $CO_2$ to phosphorus is greater than 2½ gram molecular volumes of carbon dioxide per gram atomic weight of elemental phosphorus.

2. The method of oxidizing the lower oxides of phosphorus, consisting of subjecting phosphate rock at a temperature of at least 900° C. to the action of a mixture of $CO_2$ and the oxides of phosphorus in which the concentration of $CO_2$ is greater than that stoichiometrically necessary for the oxidation of the lower oxides of phosphorus to pentavalent phosphorus.

3. The method of oxidizing phosphorus vapor, consisting of subjecting phosphate rock at a temperature of at least 900° C. to the action of a mixture of $CO_2$, $O_2$, CO, and phosphorus vapor in which at least the stoichiometric quantity of $CO_2$ and $O_2$ for oxidizing the phosphorus to the pentavalent form is present, and in which the quantity of $O_2$ is not sufficient to oxidize both the phosphorus and CO to pentavalent phosphorus and $CO_2$, respectively.

4. The method of oxidizing the lower oxides of phosphorus, consisting of subjecting phosphate rock at a temperature of at least 900° C. to the action of a mixture of $CO_2$, oxygen, CO, and the oxides of phosphorus in which at least the stoichiometric quantity of $CO_2$ and $O_2$ for oxidizing the lower oxides of phosphorus to the pentavalent form is present, and in which the quantity of $O_2$ present is not sufficient to oxidize both the phosphorus and the CO to pentavalent phosphorus and $CO_2$, respectively.

PAUL H. EMMETT.